US012020877B2

(12) United States Patent
Fasano

(10) Patent No.: US 12,020,877 B2
(45) Date of Patent: Jun. 25, 2024

(54) BI-DIRECTIONAL DC CIRCUIT BREAKER WITH SMART ELECTROMAGNETIC ARC BLOW

(71) Applicant: Carling Technologies, Inc., Plainville, CT (US)

(72) Inventor: Michael Fasano, Watertown, CT (US)

(73) Assignee: Carling Technologies, Inc., Plainville, CT (US)

( * ) Notice: Subject to any disclaimer, the term of this patent is extended or adjusted under 35 U.S.C. 154(b) by 176 days.

(21) Appl. No.: 17/944,355

(22) Filed: Sep. 14, 2022

(65) Prior Publication Data

US 2023/0110054 A1 Apr. 13, 2023

Related U.S. Application Data

(60) Provisional application No. 63/254,685, filed on Oct. 12, 2021.

(51) Int. Cl.
*H01H 33/18* (2006.01)
*H01H 33/53* (2006.01)

(52) U.S. Cl.
CPC ............ *H01H 33/18* (2013.01); *H01H 33/53* (2013.01)

(58) Field of Classification Search
CPC ........ H01H 71/38; H01H 33/53; H01H 33/18; H01H 9/345; H01H 9/362
USPC ......................................................... 361/93.1
See application file for complete search history.

(56) References Cited

U.S. PATENT DOCUMENTS 2,051,478 A * 8/1936 Hampton ............... H01H 33/18 218/31
5,818,003 A * 10/1998 Moldovan ................ H01H 9/36 218/151
6,141,192 A * 10/2000 Garzon .................. H01H 33/26 361/62

(Continued)

FOREIGN PATENT DOCUMENTS

DE 4309197 A1 * 9/1994 ............. H01H 71/08
DE 4309197 A1 9/1994

OTHER PUBLICATIONS

Machine translation of Buehrer et al. German Patent Document DE 4309197 A1 Sep. 1994 (Year: 1994).*

(Continued)

*Primary Examiner* — Kevin J Comber
(74) *Attorney, Agent, or Firm* — KDW FIRM PLLC

(57) ABSTRACT

A circuit interrupter has first and second contacts that are actuatable relative to each other between a closed position wherein a power source and a load are in electrical communication and an open position wherein the power source and the load are not in electrical communication. An arc extinguisher is also provided for extinguishing an arc that develops in the vicinity of the contacts. An electromagnetic coil, when energized, generates a magnetic field that permeates an area where the arc develops, the magnetic field urging the arc toward the arc extinguisher regardless of a polarity of the contacts. An auxiliary switch is operably connected to the contacts, such that upon movement of the contacts relative to each other from the closed position toward the open position, the auxiliary switch is activated so as to energize a circuit feeding power to the electromagnetic coil, thereby generating the magnetic field.

24 Claims, 5 Drawing Sheets

(56) References Cited

U.S. PATENT DOCUMENTS 10,236,136 B1 * 3/2019 Fasano ................. H01H 1/2066

OTHER PUBLICATIONS

International Search Report and Written Opinion for the International Patent Application No. PCT/US22/46397, mailed Feb. 28, 2023, 7 pages.

* cited by examiner

BI-DIRECTIONAL DC CIRCUIT BREAKER WITH SMART ELECTROMAGNETIC ARC BLOW

CROSS REFERENCE TO RELATED APPLICATION

This application claims the benefit of priority to U.S. Provisional Patent Application No. 63/254,685, filed Oct. 12, 2021, entitled "Bi-Directional DC Circuit Breaker with Smart Electromagnetic Arc Blow," which application is incorporated herein by reference in its entirety.

FIELD OF THE INVENTION

The present invention relates to a circuit breaker used for direct current applications, and more specifically, the invention relates to a circuit breaker with an electromagnetic arc blow that is bi-directional, in that it operates regardless of the polarity of the current flowing through the circuit breaker.

BACKGROUND OF THE INVENTION

Circuit breakers are extremely well known and are used in connection with a myriad of applications. A well-known problem with circuit breakers, however, arises when energized contacts are opened while under load. As the contacts separate, transitioning from a closed to an open position, or when the opposite occurs, an electrical arc may be formed in the gap between the contacts. An electrical arc is a plasma discharge between two points that is caused by electrical current that ionizes gasses in the air between the two points.

The creation of an arc during transition of the contacts can result in undesirable effects that negatively affect the operation of the circuit breaker, even potentially creating a safety hazard. These negative effects can also have adverse consequences on the functioning of the circuit breaker.

One possible consequence is that the arc may short to objects inside the circuit breaker and/or to surrounding objects, causing damage and presenting a potential fire or safety hazard. Another consequence of arcing is that the arc energy damages the contacts themselves, causing some material to escape into the air as fine particulate matter. The debris that has been melted off of the contacts can migrate or be flung into the mechanism of the circuit breaker, destroying the mechanism or reducing its operational lifespan. Still another effect of arcing is due to the extremely high temperature of the arc (tens of thousands of degrees Celsius), which can impact the surrounding gas molecules, thereby creating ozone, carbon monoxide, and other dangerous compounds. The arc can also ionize surrounding gasses, potentially creating alternate conduction paths.

Because of these detrimental effects, it is very important to quickly suppress or quench the arc to prevent the above-described situations, and various techniques for improved arc quenching are known. For example, it has been conceived to incorporate a permanent magnet into the circuit breaker, which produces a magnetic field to guide an arc toward an arc splitter. However, permanent magnets produce a magnetic field having a fixed direction with respect to the magnet. Thus, traditional solutions for guiding an arc into an arc path using a permanent magnet are circuit polarity dependent. This is due to the fact that a magnetic field produced by a fixed permanent magnet has a fixed direction. As such, the mechanism for magnetically guiding the arc into the path depends upon the direction the current is flowing through the circuit interrupter.

More recently, various designs have been proposed employing multiple permanent magnets and multiple arc splitters in order to achieve polarity independence. However, these designs generally tend to be relatively bulky, heavy and/or costly due to the redundancy of components, particularly the use of multiple permanent magnets, which themselves generally tend to be relatively heavy and costly.

Other known designs for improved arc quenching propose the use of an electromagnetic field to guide an arc toward an arc splitter. While these designs generally do allow for polarity independence, since the orientation of the magnetic field varies with the polarity of the current flowing therethrough, known solutions also suffer from some disadvantages. For example, generating an electromagnetic field to move an arc requires the use of power, which consequently generates heat in the device.

It is therefore desired to provide a circuit breaker with enhanced arc quenching capabilities that overcomes the above-described disadvantages. Specifically, it is desirable to provide for enhanced arc quenching that is polarity independent, while also minimizing the amount of power consumed (and thus heat generated).

SUMMARY OF THE INVENTION

Toward this end, and in accordance with one exemplary embodiment of the invention, a circuit interrupter providing for arc suppression is provided, having a first contact electrically connectable to a power source and a second contact electrically connectable to a load. The first and second contacts are actuatable relative to each other between a closed position wherein the power source and the load are in electrical communication and an open position wherein the power source and the load are not in electrical communication. An arc extinguisher is also provided for extinguishing an arc that develops in the vicinity of the first and second contacts. An electromagnetic coil, when energized, generates a magnetic field that permeates an area where the arc develops, the magnetic field urging the arc toward the arc extinguisher regardless of a polarity of the contacts. An auxiliary switch is operably connected to at least one of the first and second contacts, such that upon movement of the first and second contacts relative to each other from the closed position toward the open position, the auxiliary switch is activated so as to energize a circuit feeding power to the electromagnetic coil, thereby generating the magnetic field.

In some embodiments, the arc extinguisher comprises a first arc path and a second arc path. In certain of these embodiments, the electromagnetic coil is disposed to urge the arc toward the first arc path when a polarity of the first contact is positive, and is disposed to urge the arc toward the second arc path when the polarity of the first contact is negative.

In certain embodiments, the arc extinguisher comprises a plurality of arc splitting plates, each plate comprising a first leg partially defining the first arc path and a second leg partially defining the second arc path. In certain embodiments, the arc extinguisher comprises a first plurality of arc splitting plates defining the first arc path and a second plurality of arc splitting plates defining the second arc path.

In some embodiments, control circuitry is provided in communication with the auxiliary switch and the circuit feeding power to the electromagnetic coil, the control circuitry comprising a timer and a relay, the timer automatically causing the relay to deenergize the circuit feeding power to the electromagnetic coil after a period of time has elapsed following activation of the auxiliary switch and energizing of the circuit feeding power to the electromagnetic coil, whereby the electromagnetic coil is energized only for the period of time.

In certain of these embodiments, the period of time is less than 1 second. In certain of these embodiments, the period of time is less than 100 milliseconds. In certain of these embodiments, the period of time is about 50 milliseconds.

In some embodiments, the control circuitry, the auxiliary switch and the circuit feeding power to the electromagnetic coil receive power from a line side of the circuit interrupter.

In some embodiments, the control circuitry, the auxiliary switch and the circuit feeding power to the electromagnetic coil receive power from an auxiliary power source. In certain of these embodiments, the auxiliary power source comprises an auxiliary power supply disposed in a panel in which the circuit interrupter is disposed, along with other circuit interrupters. In certain embodiments, the auxiliary power supply comprises a transformer disposed in the panel.

In some embodiments, the circuit interrupter comprises a circuit breaker.

In accordance with another exemplary embodiment of the invention, a circuit breaker providing for arc suppression includes a first contact electrically connectable to a power source and a second contact electrically connectable to a load, the first and second contacts being actuatable relative to each other between a closed position wherein the power source and the load are in electrical communication and an open position wherein the power source and the load are not in electrical communication. An arc extinguisher is provided for extinguishing an arc that develops in the vicinity of the first and second contacts, the arc extinguisher comprising a first arc path and a second arc path. An electromagnetic coil, when energized, generates a magnetic field that permeates an area where the arc develops, the magnetic field urging the arc toward the first arc path when a polarity of the first contact is positive, and urging the arc toward the second arc path when the polarity of the first contact is negative. A relay is in electrical communication with a circuit feeding power to the electromagnetic coil, such that when the relay is open, no power is fed to the electromagnetic coil and when the relay is closed, the circuit feeding power to the electromagnetic coil is energized, thereby generating the magnetic field. An auxiliary switch is operably connected to at least one of the first and second contacts, such that upon movement of the first and second contacts relative to each other from the closed position toward the open position, the auxiliary switch is activated so cause the relay to close. A timer circuit automatically causes the relay to open after a period of time has elapsed following closing of the relay, whereby the electromagnetic coil is energized only for the period of time.

In some embodiments, the arc extinguisher comprises a plurality of arc splitting plates, each plate comprising a first leg partially defining the first arc path and a second leg partially defining the second arc path.

In some embodiments, the arc extinguisher comprises a first plurality of arc splitting plates defining the first arc path and a second plurality of arc splitting plates defining the second arc path.

In some embodiments, the period of time is less than 1 second. In certain of these embodiments, the period of time is less than 100 milliseconds. In certain of these embodiments, the period of time is about 50 milliseconds.

In some embodiments, the relay, the timer circuit, the auxiliary switch and the circuit feeding power to the electromagnetic coil receive power from a line side of the circuit breaker.

In some embodiments, the relay, the timer circuit, the auxiliary switch and the circuit feeding power to the electromagnetic coil receive power from an auxiliary power source. In certain of these embodiments, the auxiliary power source comprises an auxiliary power supply disposed in a circuit breaker panel in which the circuit breaker is disposed, along with other circuit breakers. In certain embodiments, the auxiliary power supply comprises a transformer disposed in the circuit breaker panel.

Although the invention has been described with reference to a particular arrangement of parts, features and the like, these are not intended to exhaust all possible arrangements or features, and indeed many other modifications and variations will be ascertainable to those of skill in the art.

DETAILED DESCRIPTION OF THE INVENTION

Figure 1:
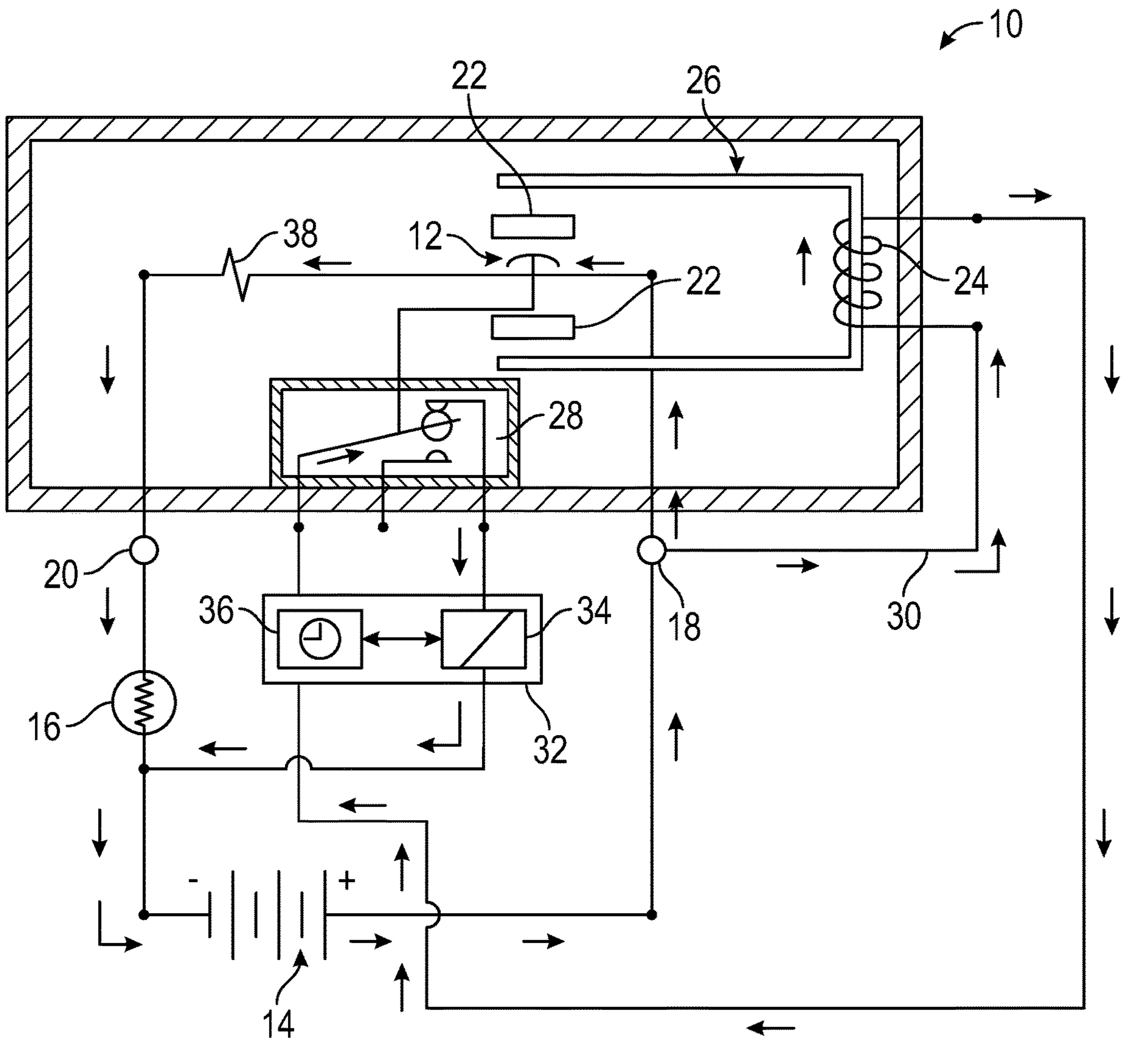
FIG. 1 a schematic view illustrating the high-level design and operation of an exemplary circuit interrupter configured in accordance with the present invention.

Referring now to the drawings, wherein like reference numerals designate corresponding structure throughout the views, FIG. 1 schematically illustrates components of a circuit interrupter (10) according to aspects of the invention, which is particularly adapted for use in direct current (DC) applications. As described more fully below, the circuit interrupter (10) has an electromagnetic arc blow that is bi-directional, in that it operates regardless of the polarity of the current flowing through the circuit interrupter (10).

The circuit interrupter (10) includes a pair of contacts (12) as is known in the art, and as is more fully described below in connection with exemplary embodiments of the invention. The contacts (12) are actuatable relative to each other between a closed position wherein a power source (14) and a load (16) are in electrical communication via, respectively, a line terminal (18) and a load terminal (20) and an open position wherein the power source (14) and the load (16) are not in electrical communication, An arc extinguisher (22) for extinguishing an arc that develops in the vicinity of contacts (12) is provided, as is discussed more fully below in connection with exemplary embodiments thereof. An electromagnetic coil (24) is provided that, when energized, generates a magnetic field that permeates an area where the arc develops, the magnetic field urging the arc toward the arc extinguisher (22) regardless of a polarity of the contacts (12), as described more fully below. The electromagnetic coil may act through one or more pole pieces (26), to aid in the positioning and configuration of the magnetic field generated by the electromagnetic coil (24).

An auxiliary switch (28) is operably connected to at least one of the contacts (12), such that upon movement of the contacts (12) relative to each other from the closed position toward the open position, the auxiliary switch (28) is activated so as to energize a circuit (30) feeding power to the electromagnetic coil (24), thereby generating the magnetic field.

More specifically, control circuitry (32) is provided in communication with the auxiliary switch (28) and the circuit (30) feeding power to the electromagnetic coil (24), which control circuitry (32) includes a timer (34) and a relay (36). Activation of the auxiliary switch (28) causes the energizing of the circuit (30) feeding power to the electromagnetic coil (24), thereby generating the magnetic field, by causing the relay (36) to close. The timer (34) automatically causes the relay (36) to open, thereby deenergizing the circuit (30) feeding power to the electromagnetic coil (24) after a period of time has elapsed following closing of the relay (36), such that the electromagnetic coil (24) is energized only for said period of time.

For purposes of illustration, but not limitation, it may be assumed that in certain situations it takes approximately 20 milliseconds following an overcurrent or fault situation for the contacts (12) to fully open and for an arc therebetween to be extinguished. In such case, for example, the control circuitry (32) may be configured to provide power to the electromagnetic coil (24) for approximately 50 milliseconds to ensure adequate time for the arc to be extinguished.

As will be recognized, providing power to the electromagnetic coil (24) for such a short period of time will generate very little heat, particularly as compared to prior art designs where power is provided continuously to the coils of an electromagnet. Thus, it is desired for the electromagnetic coil (24) to be energized for as short of a time as possible, while still ensuring adequate time for the arc to be fully extinguished. While 50 milliseconds has been found to be optimal in many situations, a shorter or longer duration may be used. For example, 100 milliseconds has also been found to provide excellent results. Preferably, however, the duration of the time period for energization of the electromagnetic coil is kept below 1 second, an any longer duration has been found to provide very little, if any, benefit, but to generate unnecessary heat.

In certain preferred embodiments, the circuit interrupter (10) takes the form of a circuit breaker, including an overcurrent trip coil or the like (38), exemplary embodiments of which are discussed in more detail below. However, such is not strictly necessary, and the present invention may find use in other types of circuit interrupters, such as switches or the like.

In the embodiment shown in FIG. 1, the control circuitry (32), the auxiliary switch (28) and the circuit (30) feeding power to the electromagnetic coil (24) receive power from a line side of said circuit interrupter, e.g., from the line terminal (18), it being recognized that the arrows in FIG. 1 are meant to represent current flow. While this design is beneficial for various reasons, as discussed below, it may be desirable instead, for example, to draw the power from an auxiliary power source instead. In such case, and referring now to FIG. 2, a circuit breaker panel (40) itself may be provided with a separate power supply, such as a transformer (42), optimally feeding all of the breakers disposed therein. As circuit breaker panels are extremely well known, a more detailed description thereof is not provided herein.

This alternative design (shown in FIG. 2) is advantageous in that the current provided to the electromagnetic coil (24) is not dependent on the amount of current being drawn by the load (16) being supplied by the circuit interrupter (10). For example, a panel mounted power supply (42) may feed a constant 60 A of power to the electromagnetic coil (24), the auxiliary switch (28) and control circuitry (32), even if the load (16) being supplied by the circuit interrupter (10) is drawing only 1 A. Thus, in the event of an overcurrent/fault, the magnetic field created by 60 A flowing through the electromagnetic coil (24) would urge an arc toward the arc extinguisher (22) with much more force than would be the case of a magnetic field created by 1 A flowing through the electromagnetic coil (24).

On the other hand, the provision of a separate panel mounted power supply (42) does have disadvantages, including increased cost and the fact that if the power supply (42) fails, one would have to pull apart the entire panel (40) in order to replace the power supply (42). This is obviously much more cumbersome that replacing a single circuit interrupter should a failure occur therein.

Figure 3:
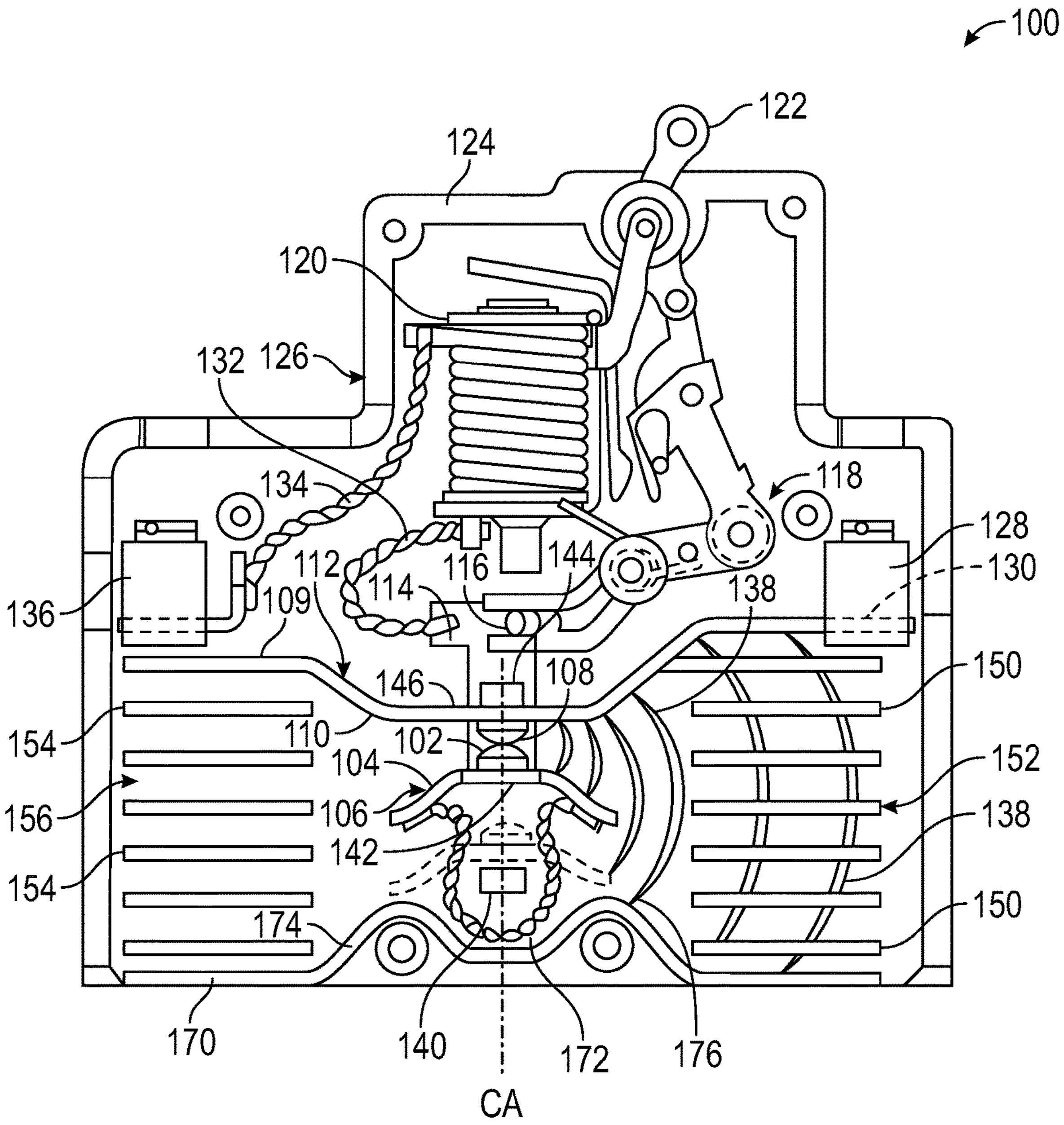
FIG. 3 a side elevational view, partially broken away, of a specific exemplary embodiment of a circuit interrupter configured in accordance with FIG. 1 or FIG. 2, in the form of a circuit breaker.
Figure 4:
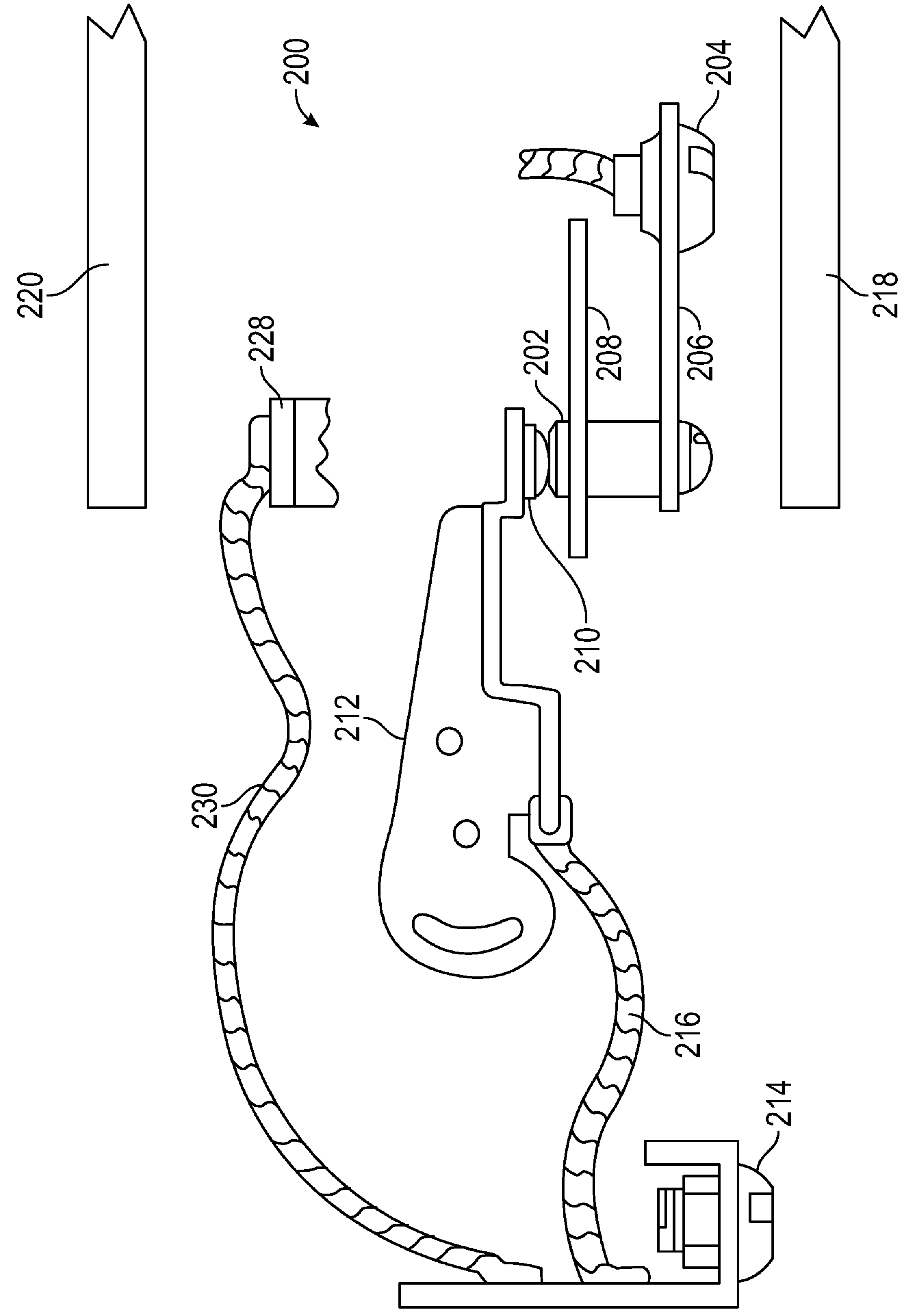
FIG. 4 a side elevational view, partially broken away, of another specific exemplary embodiment of a circuit interrupter configured in accordance with FIG. 1 or FIG. 2, in the form of a circuit breaker.
Figure 5:
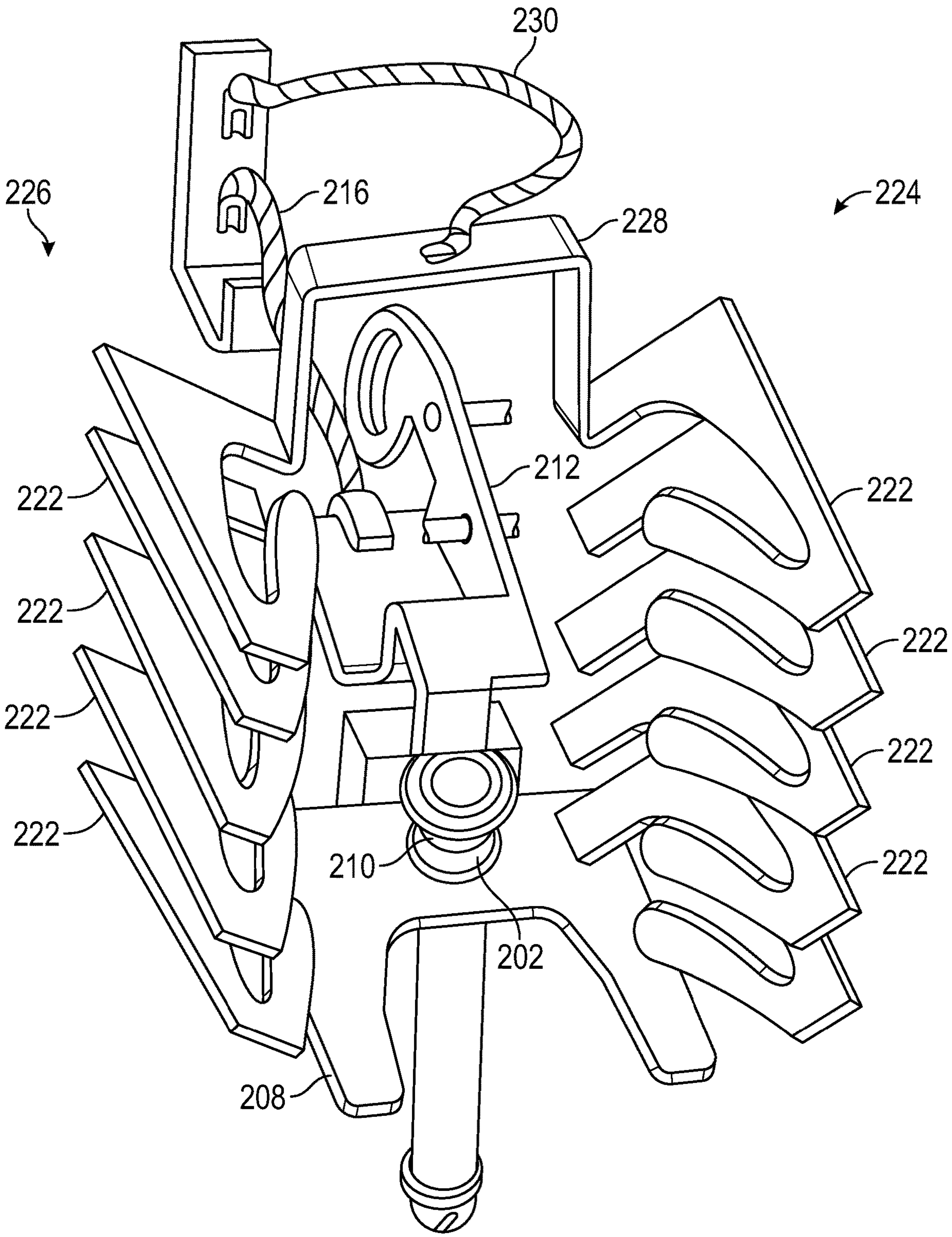
FIG. 5 an isometric view, partially broken away, showing in more detail various portions of the exemplary embodiment of the circuit interrupter shown in FIG. 4.

Turning now to FIGS. 3-5, two exemplary embodiments of circuit breakers employing the inventive concepts described above are shown. As discussed in more detail below, the main differences between the embodiment shown in FIG. 3 and the embodiment shown in FIGS. 4-5 relate to the configuration of the contacts (12) (with the FIG. 3 embodiment having an axially moveable contact and the FIGS. 4-5 embodiment having a pivotably moveable contact), and to the configuration of the arc extinguisher (22) (with the FIG. 3 embodiment having two sets of arc splitting plates and the FIGS. 4-5 embodiment having one set of arc splitting plates, each having two legs).

Figure 2:
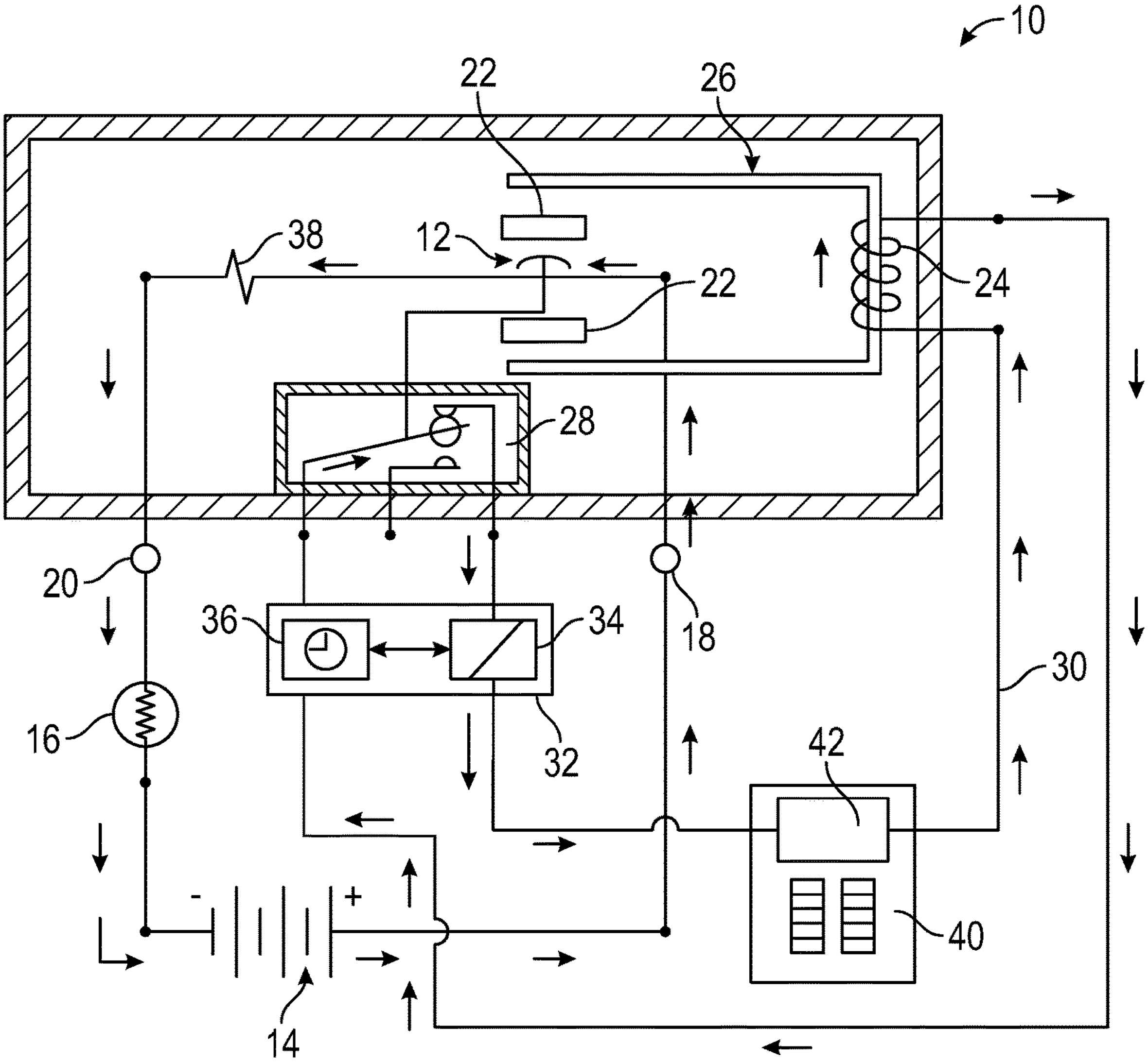
FIG. 2 a schematic view illustrating the high-level design and operation of another exemplary circuit interrupter configured in accordance with the present invention.

Referring specifically to FIG. 3, an example circuit interrupter (100) having polarity independent electromagnetic arc extinguishing features according to FIG. 1 or 2 above is shown. The circuit interrupter (100) is provided with a moveable contact (102) mounted on an upper surface (104) of a moveable contact arm (106), which moveable contact arm (106) may be provided as a generally flat elongated piece. A stationary contact (108) is mounted in a middle portion (109) of stationary contact arm (112) on a lower surface (110) thereof.

The moveable contact arm (106) is coupled to a vertical plate (114) that includes a pin (116) connected to a linkage (118). The linkage (118) is coupled to both an overcurrent measurement device (120) and a handle (122) that extends out a top side (124) of a housing (126).

In operation, the moveable contact arm (106) will displace the moveable contact (102) along axis (CA). The moveable contact (102) is illustrated in a "closed" position where moveable contact (102) is physically contacting stationary contact (108). Also shown is moveable contact (102) in an "open" position (dashed line) where moveable contact (102) has been moved a distance away from stationary contact (108) along axis (CA).

The displacement of moveable contact arm (106) is controlled by the automatic actuation of the overcurrent measurement device (120) based on a measured current flow, or by the manual actuation of the handle (122) to open, reset and close the contacts.

Electrical power is provided to the circuit breaker (100) via line terminal (128), which is connected to first end (130) of stationary contact arm (112). Electrical power is then transferred to stationary contact arm (112), which is formed of a conductive material, and then to stationary contact (108). If moveable contact (102) is in physical contact with stationary contact (108), electrical power is transmitted to moveable contact arm (104) and through vertical plate (114). Vertical plate (114) is connected to an input of overcurrent measurement device (120) via conductor (132). Electrical power is then passed from an output of overcurrent measurement device (120) via conductor (134) and to load terminal (136), which will supply power to the load (not shown).

When the moveable contact (102) is displaced along axis (CA) away from stationary contact (108), it is contemplated that an arc (138) may form in the space between the contacts. As discussed previously, the formation of an arc can have deleterious effects on the circuit breaker (100) itself and surrounding equipment. Accordingly, it is advantageous to extinguish the arc (138) as quickly as possible. To accomplish this, a lower leg (140) of pole piece (26) (as shown in FIGS. 1 and 2) is positioned below a lower surface (142) of moveable contact arm (106) and an upper leg (144) of pole piece (26) (as shown in FIGS. 1 and 2) is positioned above or on an upper surface (146) of stationary contact arm (112). The operation of electromagnetic coil (24, not shown in FIG. 3) and pole piece (26), including the upper and lower legs thereof (140, 144), is described above in connection with FIGS. 1 and 2.

In the embodiment of FIG. 3, the arc extinguisher (22, as shown in FIGS. 1 and 2) takes the form of a first series of vertically stacked plates (150) provided to the right of the contacts, defining a first arc path (152), and a second series of vertically stacked plates (154) provided to the left of the contacts and, defining a second arc path (156). The first and second series of plates (150, 154) function in a manner that is known in the art for drawing an arc away from the contacts so as to quickly extinguish it to prevent damage to the circuit interrupter (100).

A lower arc runner (170) is illustrated that extends from the first arc path (152) to the second arc path (156). The lower arc runner (170) is positioned such that it forms the lower most arc plate for both of the arc paths (152, 156). In addition, a flexible conductor (172) is provided that electrically connects the moveable contact arm (106) to the lower arc runner (170). In one configuration, the flexible conductor (172) is coupled to the lower surface (142) of moveable contact arm (106). In another configuration, the flexible conductor (170) is connected at opposite ends of the moveable contact arm (106). It is contemplated that the flexible conductor (172) may be affixed to the moveable contact arm (106) and the lower arc runner (170) by a weld or any other suitable means of permanently bonding the flexible conductor (172) in place.

When the moveable contact arm (106) is moved to the open position, it can be seen that the ends of the moveable contact arm (106) come within close proximity to two raised portions (174, 176) of lower arc runner (170). This close proximity, along with the force of the magnetic field, urges any arc (138) that forms during opening of the contacts, to be transferred off of the contacts (102, 108), onto the stationary and moveable contact arms (106, 112) and onto the lower arc runner (170) and into the arc path (152, 156) depending on the polarity of the DC voltage.

The urging of the arc (138) into either the first or second arc path (152, 156) is further discussed above in connection with FIGS. 1 and 2. Depending on the polarity of the DC voltage that is applied to the line terminal (130) the interaction of an arc (138) with the magnetic field created by the electromagnetic coil (24) and pole piece (26), with its upper and lower legs (140, 144) will have a tendency to drive the arc (138) in a first direction or in a second direction that is opposite to the first direction, as is known. Again, the operation of the electromagnetic coil (24), including the relatively short energization thereof, is discussed in detail above with respect to FIGS. 1 and 2.

It is contemplated that the various conductive portions of the circuit interrupter (100) can be supplied as a metal conductive material as is commonly used in the art, and the housing can be provided as an insulating material, such as a thermoset polyester resin material or the like, as is commonly used in the art.

Referring now specifically to FIGS. 4 and 5, another example circuit interrupter (200) having polarity independent electromagnetic arc extinguishing features according to FIG. 1 or 2 above is shown. Only differences between this exemplary circuit interrupter (200) as compared to the exemplary circuit interrupter (100) shown in FIG. 3 are shown.

The circuit interrupter (200) is provided with a stationary contact (202), which is electrically connected to a line terminal (204) via a conductor (206). The line terminal (204) receives electrical power from a power source (not shown), which in some applications is supplied by a power company. It will, however, be understood by those of skill in the art that the power may be provided and conditioned by any commercial means including, but not limited to, a commercial electrical power grid, a generator(s), solar panels, fuel cells, and so on. In the present example, stationary contact (202) is connected to a lower arc runner (208), as discussed in more detail below. Those of skill in the art will understand that lower arc runner (208) may be connected in a number of different configurations as desired without departing from aspects of the invention.

A movable contact (210) is disposed on a movable contact arm (212), which is pivotable between a closed and an open position relative to the stationary contact (202). In FIG. 4, contact arm (212) is shown in a closed position, with movable contact (210) physically contacting stationary contact (202).

Movable contact (210) is connected to load terminal (214) through a conductor (216). When contact arm (212) is in the closed position as shown, movable contact (210) is electrically connected to stationary contact (202) such that electrical current is allowed to flow between line terminal (204) and load terminal (214).

When the moveable contact (210) is pivoted with contact arm (212) away from stationary contact (202), it is contemplated that an arc (not shown) may form in the space between the contacts. As discussed previously, the formation of an arc can have deleterious effects on the circuit breaker (200) itself and surrounding equipment. Accordingly, it is advantageous to extinguish the arc as quickly as possible. To accomplish this, a lower leg (218) of pole piece (26) (as shown in FIGS. 1 and 2) is positioned below stationary contact (202) and an upper leg (220) of pole piece (26) (as shown in FIGS. 1 and 2) is positioned above moveable contact (210). The operation of electromagnetic coil (24, not shown in FIG. 4) and pole piece (26), including the upper and lower legs thereof (218, 220), is described above in connection with FIGS. 1 and 2.

In the embodiment of FIGS. 4 and 5, the arc extinguisher (22, as shown in FIGS. 1 and 2) takes the form of a series of vertically stacked plates (222), each having two legs, a first leg of which is disposed to one side of the contacts, defining a first arc path (224), and a second leg of which is disposed to the opposite side of the contacts, defining a second arc path (226) The series of plates (222), and the first and second legs thereof defining the first and second arc paths (224, 226), function in a manner that is known in the art for drawing an arc away from the contacts so as to quickly extinguish it to prevent damage to the circuit interrupter (100).

As is shown in FIG. 5, arc splitter plates (222) may be positioned at an angle relative to lower arc runner (208). An upper arc runner (228) may also be connected to load terminal (214) through a conductor (230), as is generally known in the art.

The urging of the arc into either the first or second arc path (224, 226) is further discussed above in connection with FIGS. 1 and 2. Depending on the polarity of the DC voltage that is applied to the line terminal (204) the interaction of an arc with the magnetic field created by the electromagnetic coil (24) and pole piece (26), with its upper and lower legs (218, 220), will have a tendency to drive the arc in a first direction or in a second direction that is opposite to the first direction, and toward one or the other of the first or second arc paths (224, 226). Again, the operation of the electromagnetic coil (24), including the relatively short energization thereof, is discussed in detail above with respect to FIGS. 1 and 2.

The present invention thus provides for enhanced arc quenching that is polarity independent, while also minimizing the amount of power consumed (and thus heat generated).

Although the invention has been described with reference to a particular arrangement of parts, features and the like, these are not intended to exhaust all possible arrangements or features, and indeed many other modifications and variations will be ascertainable to those of skill in the art.

What is claimed is:

1. A circuit interrupter providing for arc suppression, said circuit interrupter comprising:
- a first contact electrically connectable to a power source;
- a second contact electrically connectable to a load;
- said first and second contacts being actuatable relative to each other between a closed position wherein the power source and the load are in electrical communication and an open position wherein the power source and the load are not in electrical communication;
- an arc extinguisher for extinguishing an arc that develops in the vicinity of said first and second contacts;
- an electromagnetic coil that, when energized, generates a magnetic field that permeates an area where the arc develops, said magnetic field urging the arc toward said arc extinguisher regardless of a polarity of the contacts; and
- an auxiliary switch operably connected to at least one of said first and second contacts, such that upon movement of said first and second contacts relative to each other from the closed position toward the open position, said auxiliary switch is activated so as to energize a circuit feeding power to said electromagnetic coil, thereby generating the magnetic field.

2. The circuit interrupter of claim 1, wherein said arc extinguisher comprises a first arc path and a second arc path.

3. The circuit interrupter of claim 2, wherein said electromagnetic coil is disposed to urge the arc toward the first arc path when a polarity of the first contact is positive, and is disposed to urge the arc toward the second arc path when the polarity of the first contact is negative.

4. The circuit interrupter of claim 2, wherein the arc extinguisher comprises a plurality of arc splitting plates, each plate comprising a first leg partially defining the first arc path and a second leg partially defining the second arc path.

5. The circuit interrupter of claim 2, wherein the arc extinguisher comprises a first plurality of arc splitting plates defining the first arc path and a second plurality of arc splitting plates defining the second arc path.

6. The circuit interrupter of claim 1, further comprising control circuitry in communication with said auxiliary switch and the circuit feeding power to said electromagnetic coil, said control circuitry comprising a timer and a relay, said timer automatically causing the relay to deenergize the circuit feeding power to said electromagnetic coil after a period of time has elapsed following activation of said auxiliary switch and energizing of the circuit feeding power to said electromagnetic coil, whereby said electromagnetic coil is energized only for said period of time.

7. The circuit interrupter of claim 6 wherein said period of time is less than 1 second.

8. The circuit interrupter of claim 7 wherein said period of time is less than 100 milliseconds.

9. The circuit interrupter of claim 8 wherein said period of time is about 50 milliseconds.

10. The circuit interrupter of claim 6 wherein said control circuitry, said auxiliary switch and the circuit feeding power to said electromagnetic coil receive power from a line side of said circuit interrupter.

11. The circuit interrupter of claim 6 wherein said control circuitry, said auxiliary switch and the circuit feeding power to said electromagnetic coil receive power from an auxiliary power source.

12. The circuit interrupter of claim 11 wherein said auxiliary power source comprises an auxiliary power supply disposed in a panel in which said circuit interrupter is disposed, along with other circuit interrupters.

13. The circuit interrupter of claim 12 wherein said auxiliary power supply comprises a transformer disposed in the panel.

14. The circuit interrupter of claim 1, wherein said circuit interrupter comprises a circuit breaker.

15. A circuit breaker providing for arc suppression, said circuit breaker comprising:
- a first contact electrically connectable to a power source;
- a second contact electrically connectable to a load;
- said first and second contacts being actuatable relative to each other between a closed position wherein the power source and the load are in electrical communication and an open position wherein the power source and the load are not in electrical communication;
- an arc extinguisher for extinguishing an arc that develops in the vicinity of said first and second contacts, said arc extinguisher comprising a first arc path and a second arc path;
- an electromagnetic coil that, when energized, generates a magnetic field that permeates an area where the arc develops, said magnetic field urging the arc toward the first arc path when a polarity of the first contact is positive, and urging the arc toward the second arc path when the polarity of the first contact is negative;
- a relay in electrical communication with a circuit feeding power to said electromagnetic coil, such that when said relay is open, no power is fed to said electromagnetic coil and when said relay is closed, said circuit feeding power to said electromagnetic coil is energized, thereby generating the magnetic field;
- an auxiliary switch operably connected to at least one of said first and second contacts, such that upon movement of said first and second contacts relative to each other from the closed position toward the open position, said auxiliary switch is activated so cause said relay to close; and a timer circuit, said timer circuit automatically causing said relay to open after a period of time has elapsed following closing of said relay, whereby said electromagnetic coil is energized only for said period of time.

16. The circuit breaker of claim 15, wherein the arc extinguisher comprises a plurality of arc splitting plates, each plate comprising a first leg partially defining the first arc path and a second leg partially defining the second arc path.

17. The circuit breaker of claim 15, wherein the arc extinguisher comprises a first plurality of arc splitting plates defining the first arc path and a second plurality of arc splitting plates defining the second arc path.

18. The circuit breaker of claim 15 wherein said period of time is less than 1 second.

19. The circuit breaker of claim 18 wherein said period of time is less than 100 milliseconds.

20. The circuit breaker of claim 19 wherein said period of time is about 50 milliseconds.

21. The circuit breaker of claim 15 wherein said relay, said timer circuit, said auxiliary switch and the circuit feeding power to said electromagnetic coil receive power from a line side of said circuit breaker.

22. The circuit breaker of claim 15 wherein said relay, said timer circuit, said auxiliary switch and the circuit feeding power to said electromagnetic coil receive power from an auxiliary power source.

23. The circuit breaker of claim 22 wherein said auxiliary power source comprises an auxiliary power supply disposed in a circuit breaker panel in which said circuit breaker is disposed, along with other circuit breakers.

24. The circuit breaker of claim 23 wherein said auxiliary power supply comprises a transformer disposed in the circuit breaker panel.

* * * * *